United States Patent
Auger

(10) Patent No.: US 10,626,736 B2
(45) Date of Patent: Apr. 21, 2020

(54) POWER GENERATOR

(71) Applicant: Laurent Auger, Trois-Rivieres (CA)

(72) Inventor: Laurent Auger, Trois-Rivieres (CA)

( * ) Notice: Subject to any disclaimer, the term of this patent is extended or adjusted under 35 U.S.C. 154(b) by 0 days.

(21) Appl. No.: 16/156,225

(22) Filed: Oct. 10, 2018

(65) Prior Publication Data

US 2019/0128125 A1 May 2, 2019

(30) Foreign Application Priority Data

Oct. 31, 2017 (GB) .................. 1718008.4

(51) Int. Cl.
| | |
|---|---|
| *F01D 5/22* | (2006.01) |
| *F01D 1/02* | (2006.01) |
| *F01D 5/14* | (2006.01) |
| *F03B 13/00* | (2006.01) |

(52) U.S. Cl.
CPC .................. *F01D 5/22* (2013.01); *F01D 1/02* (2013.01); *F01D 5/141* (2013.01); *F01D 5/147* (2013.01); *F03B 13/00* (2013.01); *F05B 2220/20* (2013.01); *F05B 2220/602* (2013.01); *F05B 2240/121* (2013.01); *F05B 2240/24* (2013.01); *F05B 2250/241* (2013.01); *F05D 2220/60* (2013.01)

(58) Field of Classification Search
CPC . F01D 5/22; F01D 5/141; F01D 5/147; F01D 1/02; F05B 2220/20; F05B 2220/70; F05B 2220/602; F05B 2240/24; F05B 2240/121; F05B 2240/241; F05B 2240/301; F03D 9/25; F03D 9/35; F03D 9/008; F03D 3/04; F03D 3/061; F03D 13/20; Y02E 10/20; Y02E 10/223; Y02E 10/74; Y02E 10/728

See application file for complete search history.

(56) References Cited

U.S. PATENT DOCUMENTS

| | | |
|---|---|---|
| 1,835,018 A | 12/1931 | Darrieus |
| 4,012,163 A | 3/1977 | Baumgartner |
| 4,115,032 A | 9/1978 | Lange |
| 4,224,528 A | 9/1980 | Argo |
| 5,451,137 A | 9/1995 | Gorlov |

(Continued)

FOREIGN PATENT DOCUMENTS

| | | |
|---|---|---|
| DE | 2717379 | 10/1978 |
| FR | 2841605 | 1/2004 |

(Continued)

*Primary Examiner* — Nathaniel E Wiehe
*Assistant Examiner* — Ryan C Clark

(57) ABSTRACT

A power generator for generating power using a liquid that can alternatively flow at a lower flow rate and at a higher flow rate. The power generator includes a conduit and a rotor mounted in the conduit so as to be rotatable about a rotation axis. The rotor includes a top set of blades provided in a conduit top portion and configured for rotating about the rotation axis when the liquid flows at the higher flow rate in the conduit. The rotor also includes a bottom set of blades provided in a conduit bottom portion and configured for rotating about the rotation axis when the liquid flows at the lower flow rate in the conduit. An output shaft protrudes from the conduit and is rotatable by at least one of the top and bottom sets of blades. The top and bottom blades have different configurations.

23 Claims, 3 Drawing Sheets

(56) References Cited

U.S. PATENT DOCUMENTS

| | | | | |
|---|---|---|---|---|
| 5,451,138 A * | 9/1995 | Istorik | ............... | F03B 3/00 |
| | | | | 415/53.1 |
| 6,984,899 B1 * | 1/2006 | Rice | ............... | F03D 3/049 |
| | | | | 290/44 |
| 7,190,088 B2 * | 3/2007 | Heidel | ............... | F03B 13/00 |
| | | | | 290/43 |
| 7,887,283 B1 | 2/2011 | Mongan | | |
| 7,959,411 B2 * | 6/2011 | Schlabach | ............... | F03B 13/00 |
| | | | | 416/227 A |
| 7,980,823 B2 | 7/2011 | Akamine | | |
| 8,360,720 B2 | 1/2013 | Schlabach et al. | | |
| 8,690,541 B2 | 4/2014 | McGuire | | |
| 8,926,261 B2 | 1/2015 | Patrick | | |
| 8,939,708 B2 | 1/2015 | Gorlov | | |
| 2008/0070681 A1 | 3/2008 | Marks et al. | | |
| 2009/0110485 A1 * | 4/2009 | Cripps | ............... | E02B 9/00 |
| | | | | 405/75 |
| 2010/0233919 A1 * | 9/2010 | Ersoy | ............... | B63H 9/02 |
| | | | | 440/8 |
| 2014/1758011 | 6/2014 | Valenza | | |
| 2014/0217732 A1 * | 8/2014 | Levin | ............... | H02K 7/1823 |
| | | | | 290/52 |
| 2014/0314555 A1 * | 10/2014 | Welch | ............... | F03D 7/06 |
| | | | | 415/185 |

FOREIGN PATENT DOCUMENTS

| | | |
|---|---|---|
| GB | 2526605 | 12/2015 |
| WO | 2009150039 | 12/2009 |
| WO | 2015059505 | 4/2015 |

* cited by examiner

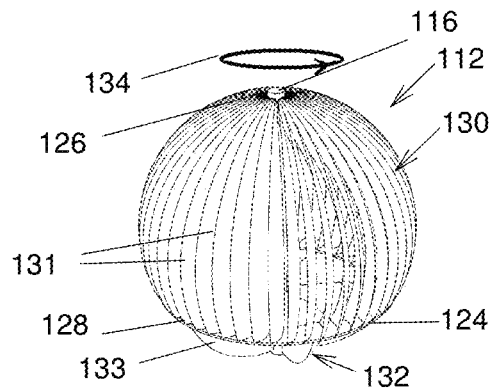
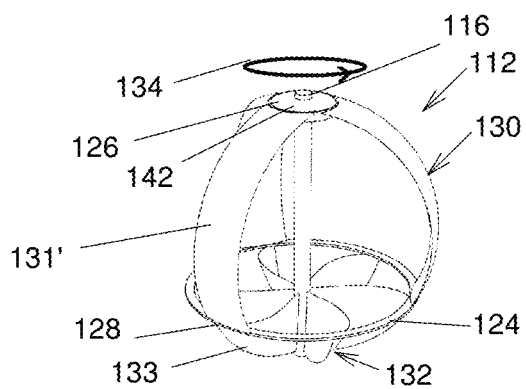
FIG. 2  FIG. 3
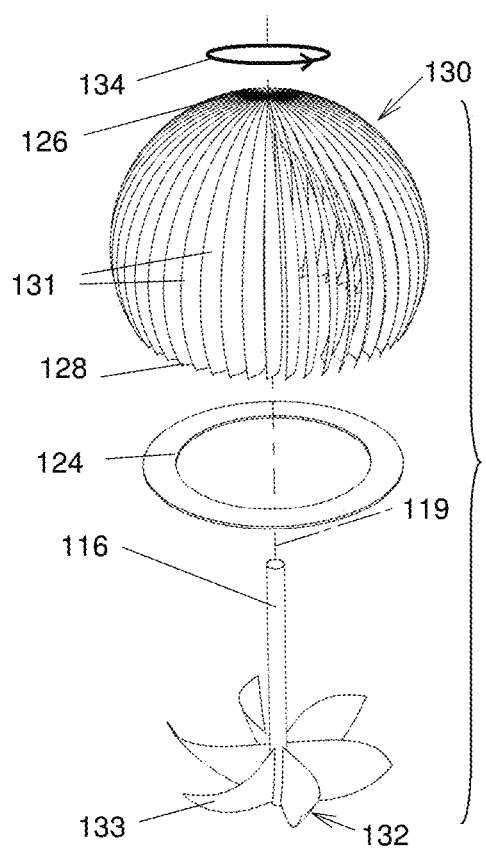
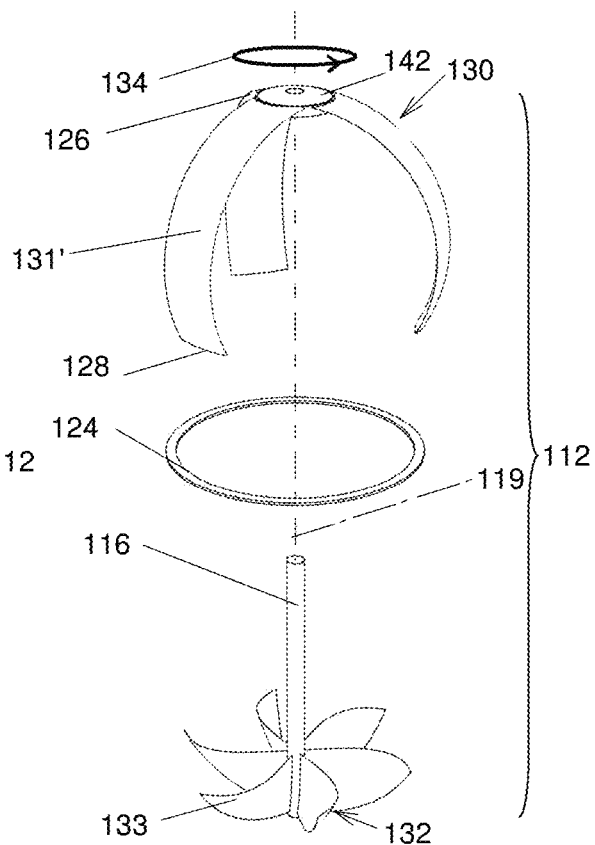
FIG. 4  FIG. 5

POWER GENERATOR

FIELD OF THE INVENTION

The present invention relates to the general field of power generation and is more specifically concerned with a power generator using a liquid flowing in a conduit to generate power.

BACKGROUND

Hydroelectric power generators are usable for capturing and converting to electrical energy the energy contained in water flowing by gravity through an elongated conduit. Such hydroelectric power generators are generally represented by a relatively short cylindrical conduit element in which a water turbine rotor is rotatably mounted, with an electric generator operatively coupled to the rotor shaft of the water turbine rotor.

In some cases, the conduit extends substantially horizontally, or at a slight downstream angle. Hydroelectric power generators in such conduits are typically configured to be efficient only at a predetermined minimum volume and flow of water flowing through the conduit in which they are installed, which is for example above 75% of the full capacity of the conduit. Thus, in some applications such as in storm water discharge conduits and water conduits at the exit of sewage treatment plants and the like, this type of hydroelectric power generator is generally not efficient all year round since the volume and flow of water through these conduits can vary largely from season to season. For example, the volume and flow of water through these conduits may vary from between a maximum capacity of the conduits during rain storms or snow melting seasons, to only a low volume and flow of water runoff flowing longitudinally along a bottom surface portion thereof at other times.

Against this background, there exists a need in the industry to provide improved power generators. An object of the present invention is therefore to provide such power generators.

SUMMARY OF THE INVENTION

In a broad aspect, there is provided a power generator for generating power using a liquid that can alternatively flow at a lower flow rate and at a higher flow rate, the power generator, comprising: a conduit, the conduit defining conduit top and bottom portions, wherein, at the lower flow rate, the liquid only flows in the conduit bottom portion, and, at the higher flow rate, the liquid flows both in the conduit top and bottom portions; a rotor mounted in the conduit so as to be rotatable about a rotation axis, the rotor including a top set of blades provided in the conduit top portion and including top blades circumferentially distributed around the rotation axis and configured for rotating about the rotation axis when the liquid flows at the higher flow rate in the conduit; and a bottom set of blades provided in the conduit bottom portion and including bottom blades circumferentially distributed around the rotation axis and configured for rotating about the rotation axis when the liquid flows at the lower flow rate in the conduit; an output shaft protruding from the conduit, at least one of the top and bottom sets of blades being operatively coupled to the output shaft for rotating the output shaft when the liquid rotates the at least one of the top and bottom sets of blades when flowing through the conduit; wherein the top and bottom blades have different configurations.

There may also be provided a power generator wherein the top blades are configured to efficiently capture power from the liquid at the higher flow rate and the bottom blades are configured to efficiently capture power from the liquid at the lower flow rate.

There may also be provided a power generator wherein the bottom blades each extend generally outwardly away from the rotation axis.

There may also be provided a power generator wherein the top set of blades defines top set top and bottom ends; and the top blades are each substantially arcuate and extend between the top set top and bottom ends.

There may also be provided a power generator wherein the top blades converge towards each other at the top set top end and are spaced apart from the rotation axis at the top set bottom end.

There may also be provided a power generator wherein both the top and bottom sets of blades are operatively coupled to the output shaft for rotating the output shaft when the liquid rotates the top and bottom sets of blades when flowing through the conduit.

There may also be provided a power generator wherein the conduit is substantially cylindrical.

There may also be provided a power generator wherein the top set of blades has a substantially truncated sphere shaped configuration.

There may also be provided a power generator wherein the truncated sphere shaped configuration and the conduit have substantially similar diameters.

There may also be provided a power generator further comprising a substantially annular junction member provided at the top set bottom end, the top blades being secured to the junction member.

There may also be provided a power generator wherein the bottom blades are secured to the junction member.

There may also be provided a power generator wherein the output shaft is substantially collinear with the rotation axis and the top blades are secured to the output shaft at the top set top end.

There may also be provided a power generator wherein the junction member is between about ⅔ and ⅘ of a conduit diameter away from the top set top end.

There may also be provided a power generator wherein the top blades overlap so that there is at least one radius extending from the rotation axis that intersects at least two of the top blades.

There may also be provided a power generator wherein the top blades are circumferentially spaced apart from each other so that no radius extending from the rotation axis intersects more than one of the top blades.

There may also be provided a power generator wherein the bottom blades extend generally radially outwardly from the output shaft.

There may also be provided a power generator wherein the bottom blades each have a substantially curved L-shaped configuration.

There may also be provided a power generator wherein the conduit defines a conduit upstream portion upstream of the bottom set of blades in the conduit bottom portion, the power generator further comprising at least one vane in the conduit upstream portion for redirecting the liquid.

There may also be provided a power generator wherein the at least one vane includes a pair of vanes in the conduit upstream portion, the vanes converging in a downstream direction along at least part thereof.

There may also be provided a power generator wherein the at least one vane obstructs a transversal half of the conduit bottom portion located on one transversal side of the rotation axis.

There may also be provided a power generator wherein the rotation axis defines a transition height at an interface between the conduit top and bottom portions, the at least one vane defining a vane top end at substantially the transition height.

There may also be provided a power generator wherein the power generator is provided in an output pipe of a waste water treatment plant discharging treated waste water.

In another broad aspect, there is provided a power generator for generating power using a liquid that can alternatively flow at a lower flow rate and at a higher flow rate, the power generator, comprising: a conduit, the conduit defining conduit top and bottom portions, wherein, at the lower flow rate, the liquid only flows in the conduit bottom portion, and, at the higher flow rate, the liquid flows at least in the conduit top portion; a rotor mounted in the conduit so as to be rotatable about a rotation axis, the rotor including a top set of blades provided in the conduit top portion and including top blades circumferentially distributed around the rotation axis and configured for rotating about the rotation axis when the liquid flows at the higher flow rate in the conduit; and a bottom set of blades provided in the conduit bottom portion and including bottom blades circumferentially distributed around the rotation axis and configured for rotating about the rotation axis when the liquid flows at the lower flow rate in the conduit; wherein the top and bottom blades have different configurations.

Advantageously, the proposed power generator can be configured to substantially effectively capture and convert into a rotational force, and thus, in some embodiment, to electrical power, a relatively wide range of volume and flow rates of the liquid running trough the conduit.

The present application claims priority from UK Request for a Patent 1718008.4 filed Oct. 31, 2017, the contents of which is hereby incorporated by reference in its entirety.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 2, in a perspective view, illustrates an embodiment of a rotor part of the power generator of FIG. 1;

FIG. 3, in a perspective view, illustrates another embodiment of a rotor usable in the power generator of FIG. 1;

FIG. 4, in a perspective exploded view, illustrates the rotor shown in FIG. 2;

FIG. 5, in a perspective exploded view, illustrates the rotor shown in FIG. 3;

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art. Also, directional terminology, such as "top" and "bottom" refers to a typical installation of the invention in a substantially horizontal or slightly angled conduit and is used for convenience purposes in describing the proposed power generator. This terminology should not be used to unduly restrict the scope of the appended claims.

Figure 1:
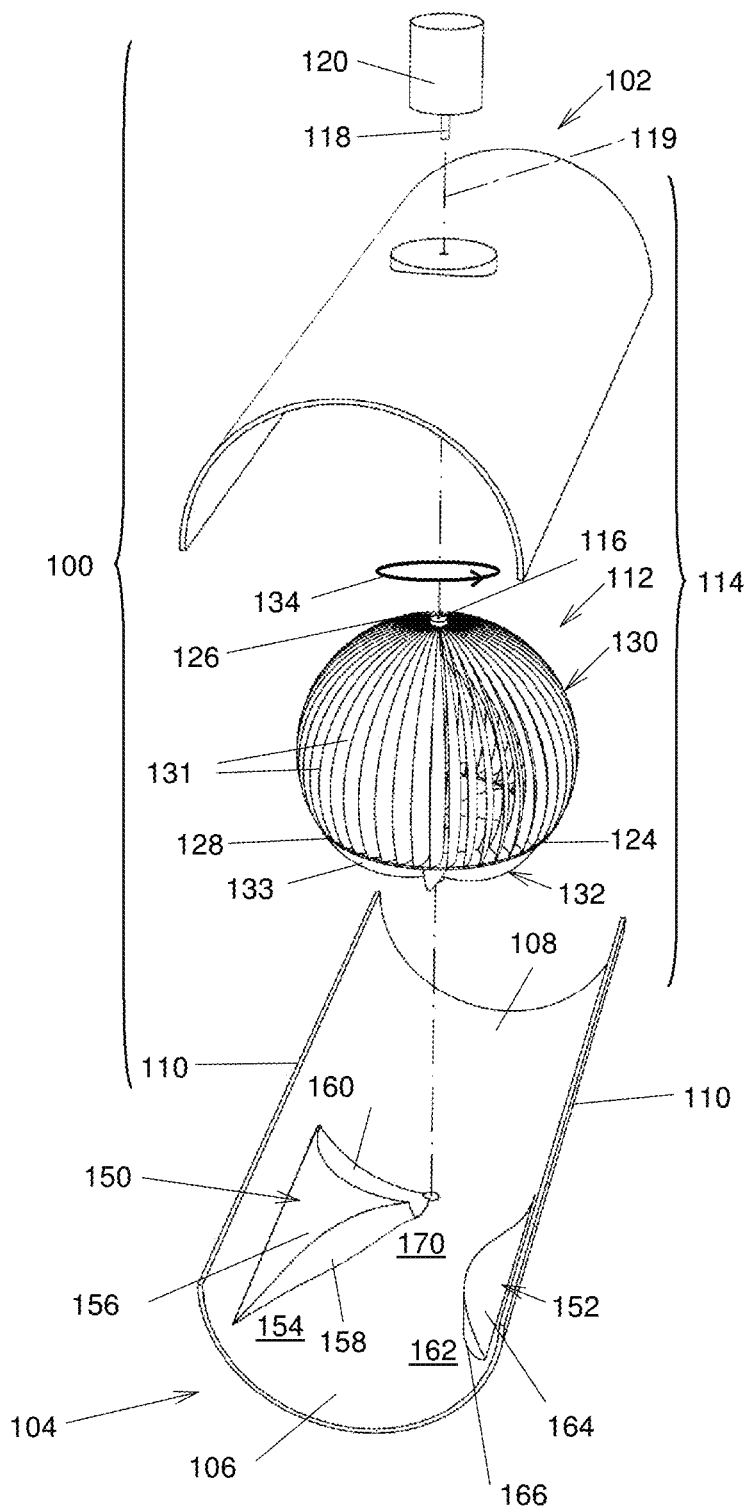
FIG. 1, in a front end perspective, exploded view, illustrates a power generator according to an embodiment of the present invention.

FIG. 1 illustrates various aspects of an embodiment of a power generator 100. The power generator 100 is an hydroelectric power generator that uses a moving liquid, represented for example in FIG. 10 by arrows 101, to generate electricity. However, similar generators that do not convert mechanical energy to electricity, but that instead use this mechanical energy directly in a mechanical system are within the scope of the present invention. The liquid 101 may in some embodiments have small particles in suspension if these particles don't interfere unduly with the power generator 100 functionality. The liquid 101 can alternatively flow at a lower flow rate and at a higher flow rate. For orientation purposes, as illustrated in FIG. 1, the power generator 100 generally defines a top portion 102, a bottom portion 104, an upstream end 106, a downstream end 108, and opposed lateral sides 110.

Still referring to FIG. 1, the power generator 100 generally comprises a conduit 114 in which the liquid 101 flows and a rotor 112 mounted in the conduit 114 so as to be rotatable about a rotation axis 119. The conduit 114 may be for example a section part of a longer pipe. Typically, by not necessarily, the conduit 114 is substantially cylindrical. Also, the conduit 114 is typically substantially horizontal or slightly sloped relative to the horizontal. However, conduits 114 that are angled differently are also within the scope of the invention. The conduit 114 defines conduit top and bottom portions 105 and 103. At the lower flow rate, the liquid 101 only flows in the conduit bottom portion 103. At the higher flow rate, the liquid 101 flows both in the conduit top and bottom portions 105 and 103, as illustrated for example in FIG. 9.

Returning to FIG. 1, the rotor 112 is at least slightly smaller than the inner diameter of the conduit 114 for free rotation therein. The rotor 112 includes a top set of blades 130 provided in the conduit top portion 105 and including top blades 131 circumferentially distributed around the rotation axis 119 and configured for rotating about the rotation axis 119 when the liquid 101 flows at the higher flow rate in the conduit 114. The rotor 112 also includes a bottom set of blades 132 provided in the conduit bottom portion 103 and including bottom blades 133 circumferentially distributed around the rotation axis 119 and configured for rotating about the rotation axis 119 when the liquid 101 flows at the lower flow rate in the conduit. Typically, the bottom blades 133 also rotate about the rotation axis 119 when the liquid 101 flows at the higher flow rate in the conduit.

An output shaft 118 protrudes from the conduit 114. At least one of the top and bottom sets of blades 130 and 132 is operatively coupled to the output shaft 118 for rotating the output shaft 118 when the liquid 101 rotates the at least one of the top and bottom sets of blades 130 and 132 when flowing through the conduit 114. Typically, both the top and bottom sets of blades 130 and 132 are operatively coupled to the output shaft 118 for rotating the output shaft 118 when the liquid 101 rotates the top and bottom sets of blades 130 and 132 when flowing through the conduit 114. In such embodiments, the top and bottom sets of blades 130 and 132 both rotate at the same angular speed. However, in other embodiments (not shown in the drawings), the top and bottom sets of blades 130 and 132 are each mounted to a respective output shaft so that they can rotate at different speeds. In such cases, a bearing may be provided between the top and bottom sets of blades 130 and 132.

The top and bottom blades 131 and 133 have different configurations. The top blades 131 are configured to efficiently capture power from the liquid 101 at the higher flow rate and the bottom blades 133 are configured to efficiently capture power from the liquid 101 at the lower flow rate. Indeed, the configuration, dimensions, numbers and relative position of the top and bottom blades 131 and 133 that is optimal to capture power from the moving liquid differs according to the quantity of liquid and to its speed. By having a portion of the rotor 112 optimized for the lower flow rate, and a portion of the rotor optimized for the higher flow rate, the power generator 100 can operate relatively efficiently at both of these flow rates.

In some embodiments, the output shaft 118 includes a rotor shaft portion 116. The rotor shaft portion 116 is rotatably mounted centrally in the conduit 114, collinear with the rotation axis 119, generally perpendicular to a conduit longitudinal axis. However, in other embodiments, the output shaft 118 may be offset from the rotation axis 119 and linked to the rotor 112 through a gearbox or a similar device having a function of transferring the rotation of the top and bottom sets of blades 130 and 132 to the output shaft 118.

When electrical power is generated, the power generator 100 further includes an electrical generator 120 mounted typically along an outer surface portion of the conduit 114 and the output shaft 118 is mechanically coupled to the electrical generator to produce electricity when rotated.

As it will be described in details further below, in some embodiments of the invention, the power generator 100 further generally comprises one or more vanes 150 and 152 protruding along selected inner surface portions of the upstream end 106 of the conduit 114 for optimizing the direction of a relatively low volume and flow of liquid 101 towards the bottom set of blades 132.

The top set of blades 130 defines top set top and bottom ends 126 and 128. In some embodiments, the rotor 112 further includes a substantially annular junction member 124 positioned coaxially relative to the output shaft 118 and at a predetermined position relative to the rotation axis 119. The junction member 124 is provided a transition height at an interface between the conduit top and bottom portions 105 and 103. Typically, the junction member 124 is provided at the top set bottom end 128. In an example of embodiment, the predetermined position of the annular junction member 124 may be between two thirds and four fifths of the diameter of the conduit 114 away from the top set top end 126, but other values are within the scope of the appended claims. For example, as illustrated in the figures, the predetermined position of the annular junction member 124 is roughly three fourths of the diameter of the conduit 114 away from the top set top end 126.

The top set of blades 130 has a substantially truncated sphere shaped configuration. Typically, the truncated sphere shaped configuration and the conduit have substantially similar diameters. The top blades 131 extend typically in an equidistantly spaced apart relation relative to one another around the rotation axis 119. The top blades 131 are each substantially arcuate and converge towards each other at the top set top end 126 and are spaced apart from the rotation axis 119 at the top set bottom end 128. For example, the top blades 131 are secured to the annular junction member 124 at the top set bottom end 128 and the top blades 131 are secured to the output shaft 118 at the top set top end 126. In some embodiments, the rotor shaft portion 116 may be omitted, for example if the structure provided by the top blades 131 and the annular junction member is rigid enough.

The bottom blades 133 each extend substantially radially relative to the rotation axis 119. Since the bottom blades 133 are typically not straight, they have for example a substantially curved L-shaped configuration, this radial orientation is only a general orientation of the blades and portions of the bottom blades 133 may be in a direction that is not purely radial. However, the blades have a portion thereof that is close to the rotation axis 119 and a portion thereof that is further away from the rotation axis. For example, each one of the bottom blades 133 extends from the output shaft 118 and the bottom blades 133 are circumferentially spaced apart from each other around the output shaft 118.

As illustrated in the figures, the top blades 131, the bottom blades 133 and the annular junction member 124 are suitably configured and sized such that their outer radius cooperatively form a substantially spherical configuration for the rotor 112.

In one non-limiting embodiment of the rotor 112, as illustrated in FIGS. 2 and 4, the rotor 112 includes between twenty (20) and eighty (80) top blades 131, and between three (3) and twelve (12) bottom blades 133. For example, the rotor 112 includes forty-eight (48) top blades 131 and six (6) bottom blades 133. Other numbers of top and bottom blades 131 and 133 are also possible.

Figure 6:
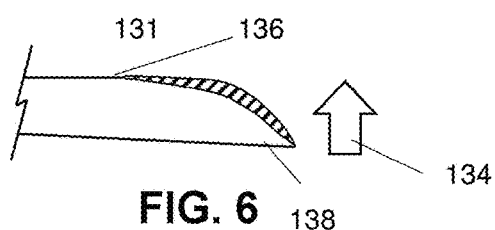
FIG. 6, in a partial, cross-sectional view, illustrates an embodiment of a top blade part of the rotor of FIG. 2.

Furthermore, as illustrated in FIG. 6, in some embodiments, each top blade 131 has a substantially bow shaped cross-section extending towards the direction of rotation 134 of the rotor 112, at least along a portion near the greatest radius of the top blade 131 relative to the output shaft 118. Thus, each top blade 131 defines a leading and a trailing longitudinal edge 136 and 138 respectively, relative to the direction of rotation 134 of the rotor 112. In some embodiments of the rotor 112 having a relatively large number of top blade 131, the top blades 131 overlap so that there is at least one radius extending from the rotation axis 119 that intersects at least two of the top blades 131. Thus, the top blades 131 are suitably configured and shaped for cooperatively capturing and converting into a rotational force a relatively high flow and volume of water entering the upstream end 106 of the conduit 114. In some embodiments of the rotor 112 (not shown in the figures), each top blade 131 has its surface extending up to the output shaft 118 (e.g. each top blade 131 has no leading edge 136).

Figure 8:
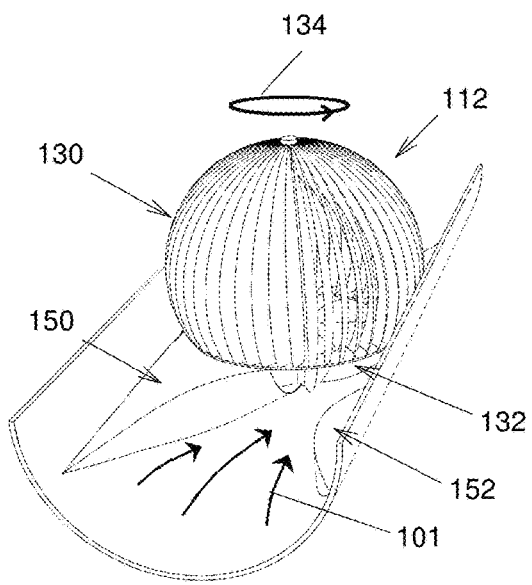
FIG. 8, in a front end perspective, cross-sectional view, illustrates the power generator of FIG. 1, here shown including a pair vanes directing a relatively small volume and flow of water towards a bottom set of blades of the rotor.
Figure 9:
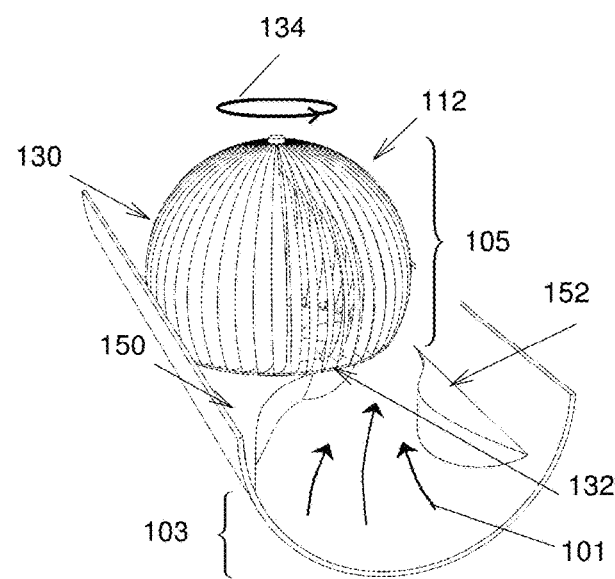
FIG. 9, in a front end perspective, cross-sectional view, illustrates the power generator of FIG. 8, here shown from a slightly different front end angle relative thereof.

As best illustrated in FIG. 4, each bottom blade 133 has a substantially sheet-like blade configuration extending substantially vertically and radially away from a longitudinal side portion of the rotor shaft 118 and ends in an at least slightly curved configuration towards a direction opposite a direction of rotation of the rotor 112. Thus, as illustrated in FIGS. 8 and 9, each bottom blade 133 is suitably configured and shaped for cooperatively capturing and converting into a rotational force a relatively low flow and volume of liquid 101 entering the upstream end 106 and flowing longitudinally along a bottom surface portion of the conduit 114.

In another embodiment of the rotor 112, as illustrated in FIGS. 3 and 5, the rotor 112 includes between two (2) and six (6) top blades 131', and between three (3) and twelve (12) bottom blades 133. For example, the rotor 112 of the presently described embodiment includes three (3) top blades 131' and six (6) bottom blades 133. Other numbers of top and bottom blades 131' and 133 are also possible.

Figure 7:
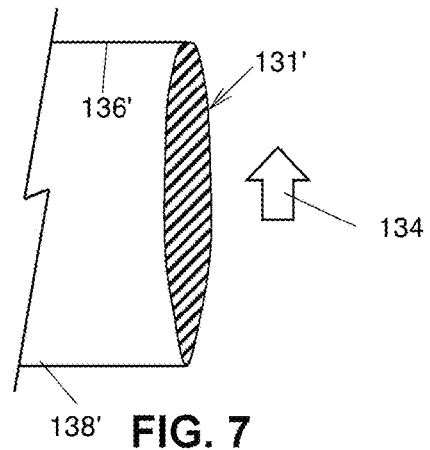
FIG. 7, in a partial, cross-sectional view, illustrates an embodiment of a top blade part of the rotor of FIG. 3.

As illustrated in FIG. 7, in this embodiment, each top blade 131' has a substantially rectilinear airfoil shaped cross-section extending towards the direction of rotation 134 of the rotor 112, at least along a portion near the greatest radius of the top blade 131' relative to the output shaft 118. As exemplified in the figures, the cross-section of each top blade 131' of the presently described embodiment of the rotor 112 is typically relatively greater than the cross-section of the top blades 131 of the previously described embodiment of the rotor 112. Furthermore, the top end portion of each top blade 131 may be attached to the output shaft 118, at the top set top end 126, through a junction support disk 142. Furthermore, in some embodiments (not shown in the figures), the longitudinal alignment of each top blade 131 may be at a slightly skewed angle towards the direction of rotation 134 of the rotor 112, relative to the output shaft 118.

Thus, each one in the plurality of top blade 131' defines a leading and a trailing longitudinal edge 136' and 138' respectively, relative to the direction of rotation 134 of the rotor 112. In this embodiment, the top blades 131' are circumferentially spaced apart from each other so that there no radius extending from the rotation axis 119 intersects more than one of the top blades 131'. The top blades 131' are also suitably configured for capturing and converting into a rotational force a relatively high flow and volume of water entering the upstream end 106 of the conduit 114.

The bottom blades 133 of the presently described embodiment of the rotor 112 are substantially similar in size and shape configuration to the plurality of bottom blades 133 of the previously described embodiment of the rotor 112 illustrated in FIGS. 2 and 4.

The output shaft 118 is typically rotatably mounted on suitable roller bearing elements (not shown in the drawings). Typically, the conduit 114 has a length dimension that is at least equivalent to the diameter of the rotor 112.

Figure 10:
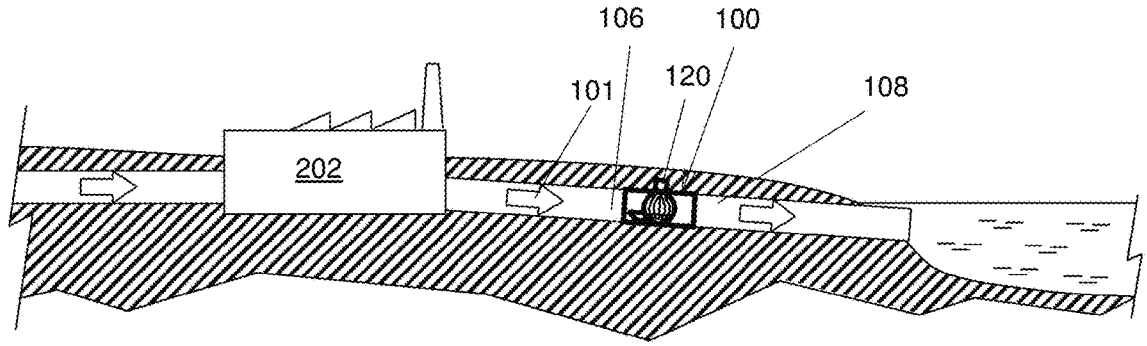
FIG. 10, in an environmental, cross-sectional view, illustrates the power generator in FIG. 1 mounted along a water conduit at the exit of a sewage treatment plant.

Advantageously, as illustrated in FIGS. 1 and 10, the electrical generator 120 may be mounted on top of the conduit 114. As would be obvious to someone familiar with water turbines in general, the output shaft 118 of the rotor 112 may be operatively coupled to any other types of rotating machine requiring rotational power.

As indicated further above, in some embodiments of the invention, the power generator 100 may further comprise one or more vanes 150 and 152 that are suitably shaped and sized for optimizing the flow direction of a relatively small volume and flow of liquid 101 entering the upstream end 106 of the conduit 114 towards a bottom portion of the rotor 112. In some embodiments, as exemplified in FIGS. 1, 8 and 9, first and second vanes 150 and 152 are provided. The vanes 150 and 152 are provided upstream of the rotor 112 and converge towards each other in a downstream direction along at least part thereof. In some embodiments, the vanes 150 and 152, for example vane 150 as in the drawings, obstruct a transversal half of the conduit bottom portion 103 located on one transversal side of the rotation axis 119 so that the liquid 101 is directed along the bottom blades 133 that rotate downstream. This reduces the resistance on the rotor 112 that would be caused by the upstream moving portions of the bottom blades 133 if they were exposed to the downstream flowing liquid 101. The vanes 150 and 152 typically extend up to the transition height.

More specifically, the first vane 150 protrudes from a lower inner side surface portion 154 of the conduit 114 that is adjacently upstream the rotor 112 and on the same side thereof where the bottom blades 133 are rotating towards the upstream direction. The first vane 150 defines a first vane top surface 156, a first vane side surface 158, and a first vane downstream surface 160. The first vane downstream surface 160 defines a concave and partially hemispheric configuration that substantially conforms to the spherical shaped of the rotor 112.

The second vane 152 protrudes from a lower inner side surface portion 162 that is substantially opposite the first vane 150. The second vane 152 defines a second vane top surface 164 and a second vane side surface 166 that is substantially oppositely facing the first vane side surface 158.

As best illustrated in FIG. 1, the first and second vane side surfaces 158 and 166 cooperatively define a slightly tapered channel 170 extending substantially towards the downstream direction along a sinuous path converging toward a lateral half bottom portion of the rotor 112 where the bottom blades 133 are rotating towards the downstream direction.

Typically, the one or more vanes 150 and 152 have an overall height dimension, relative to the lowermost inner surface of the conduit 114, such that their top surface portions, for example, 156 and 164 in the figures, are substantially in register with the annular junction member 124 of the rotor 112.

Thus, the capture and conversion into a rotational force of a relatively low volume and flow of water runoff 200 entering upstream of, and flowing longitudinally along a bottom surface portion of, the conduit 114, may be significantly optimized by the presence of the one or more vanes 150 and 152 in the conduit 114. Other shapes, numbers and sizes for the vanes 150 and 152 are also usable.

The power generator 100 of the present invention may have any practical overall dimensions customized for a given power generation application. For example, as illustrated in FIG. 10, the power generator 100 may be suitably sized so as to be advantageously used for converting into electrical energy the flow of water flowing through the conduits at the exit of a sewage treatment plant 202. The flow of water through these conduits typically has a wide range of rates due to the varying nature of the rainy and/or winter seasons in certain countries. Other applications of the present invention are also possible.

As would be obvious to someone in the appropriate field, the power generator 100 of the present invention may be made of suitably rigid, durable and rust treated materials typically used in the assembly of hydroelectric power generators.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A power generator for generating power using a liquid that can alternatively flow at a lower flow rate and at a higher flow rate, the power generator, comprising:
a conduit, the conduit defining conduit top and bottom portions, wherein, at the lower flow rate, the liquid only flows in the conduit bottom portion, and, at the higher flow rate, the liquid flows both in the conduit top and bottom portions, the conduit also defining a conduit longitudinal axis;
a rotor mounted in the conduit so as to be rotatable about a rotation axis, the rotation axis being substantially perpendicular to the conduit longitudinal axis, the rotor including
a top set of blades provided in the conduit top portion and including top blades circumferentially distributed around the rotation axis and configured for rotating about the rotation axis when the liquid flows at the higher flow rate in the conduit; and
a bottom set of blades provided in the conduit bottom portion and including bottom blades circumferentially distributed around the rotation axis and configured for rotating about the rotation axis when the liquid flows at the lower flow rate in the conduit;
an output shaft protruding from the conduit, at least one of the top and bottom sets of blades being operatively coupled to the output shaft for rotating the output shaft when the liquid rotates the at least one of the top and bottom sets of blades when flowing through the conduit;
wherein the top and bottom blades have different configurations.

2. The power generator as defined in claim 1, wherein the top blades are configured to efficiently capture power from the liquid at the higher flow rate and the bottom blades are configured to efficiently capture power from the liquid at the lower flow rate.

3. The power generator as defined in claim 1, wherein the bottom blades each extend generally outwardly away from the rotation axis.

4. The power generator as defined in claim 3, wherein
the top set of blades defines top set top and bottom ends; and
the top blades are each substantially arcuate and extend between the top set top and bottom ends.

5. The power generator as defined in claim 4, wherein the top blades converge towards each other at the top set top end and are spaced apart from the rotation axis at the top set bottom end.

6. The power generator as defined in claim 5, wherein both the top and bottom sets of blades are operatively coupled to the output shaft for rotating the output shaft when the liquid rotates the top and bottom sets of blades when flowing through the conduit.

7. The power generator as defined in claim 6, wherein the conduit is substantially cylindrical.

8. The power generator as defined in claim 7, wherein the top set of blades has a substantially truncated sphere shaped configuration.

9. The power generator as defined in claim 8, wherein the truncated sphere shaped configuration and the conduit have substantially similar diameters.

10. The power generator as defined in claim 6, further comprising a substantially annular junction member provided at the top set bottom end, the top blades being secured to the junction member.

11. The power generator as defined in claim 10, wherein the bottom blades are secured to the junction member.

12. The power generator as defined in claim 10, wherein the output shaft is substantially collinear with the rotation axis and the top blades are secured to the output shaft at the top set top end.

13. The power generator as defined in claim 10, wherein the junction member is between about ⅔ and ⅘ of a conduit diameter away from the top set top end.

14. The power generator as defined in claim 4, wherein the top blades overlap so that there is at least one radius extending from the rotation axis that intersects at least two of the top blades.

15. The power generator as defined in claim 4, wherein the top blades are circumferentially spaced apart from each other so that no radius extending from the rotation axis intersects more than one of the top blades.

16. The power generator as defined in claim 3, wherein the bottom blades extend generally radially outwardly from the output shaft.

17. The power generator as defined in claim 16, wherein the bottom blades each have a substantially curved configuration.

18. The power generator as defined in claim 3, wherein the conduit defines a conduit upstream portion upstream of the bottom set of blades in the conduit bottom portion, the power generator further comprising at least one vane in the conduit upstream portion for redirecting the liquid.

19. The power generator as defined in claim 18, wherein the at least one vane includes a pair of vanes in the conduit upstream portion, the vanes converging in a downstream direction along at least part thereof.

20. The power generator as defined in claim 18, wherein the at least one vane obstructs a transversal half of the conduit bottom portion located on one transversal side of the rotation axis.

21. The power generator as defined in claim 18, wherein the rotation axis defines a transition height at an interface between the conduit top and bottom portions, the at least one vane defining a vane top end at substantially the transition height.

22. The power generator as defined in claim 1, wherein the power generator is provided in an output pipe of a waste water treatment plant discharging treated waste water.

23. A power generator for generating power using a liquid that can alternatively flow at a lower flow rate and at a higher flow rate, the power generator, comprising:
a conduit, the conduit defining conduit top and bottom portions, wherein, at the lower flow rate, the liquid only flows in the conduit bottom portion, and, at the higher flow rate, the liquid flows at least in the conduit top portion, the conduit also defining a conduit longitudinal axis;
a rotor mounted in the conduit so as to be rotatable about a rotation axis, the rotation axis being substantially perpendicular to the conduit longitudinal axis, the rotor including
a top set of blades provided in the conduit top portion and including top blades circumferentially distributed around the rotation axis and configured for rotating about the rotation axis when the liquid flows at the higher flow rate in the conduit; and a bottom set of blades provided in the conduit bottom portion and including bottom blades circumferentially distributed around the rotation axis and configured for rotating about the rotation axis when the liquid flows at the lower flow rate in the conduit;
wherein the top and bottom blades have different configurations.

* * * * *